I. COOPER.
AUTOMOBILE RADIATOR.
APPLICATION FILED OCT. 26, 1907.
912,289. Patented Feb. 16, 1909.
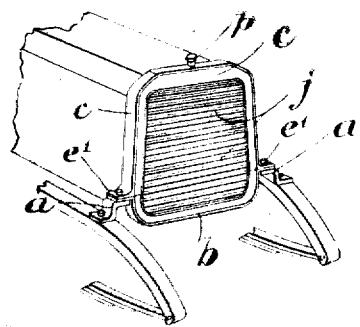
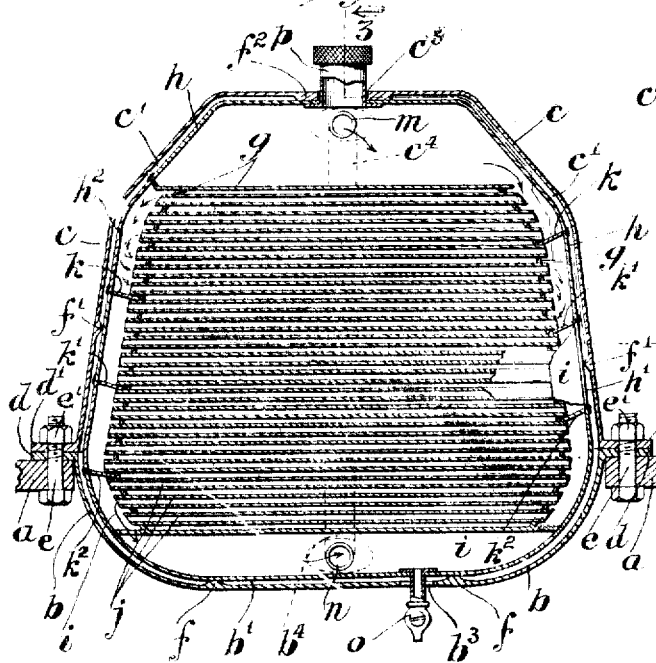 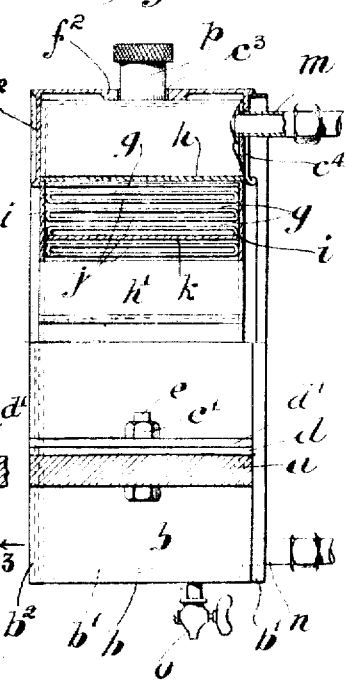

UNITED STATES PATENT OFFICE.

ISIDOR COOPER, OF NEW YORK, N. Y.

AUTOMOBILE-RADIATOR.

No. 912,289.　　　　Specification of Letters Patent.　　　　Patented Feb. 16, 1909.

Application filed October 26, 1907. Serial No. 399,282.

*To all whom it may concern:*

Be it known that I, ISIDOR COOPER, a citizen of Switzerland, residing at the borough of Brooklyn, city of New York, county of Kings, and State of New York, have invented certain new and useful Improvements in Automobile - Radiators, of which the following is a specification, reference being had therein to the accompanying drawings, which form a part thereof.

My invention relates to automobile radiators, and more particularly to the manner of constructing and assembling same to secure the required efficiency and facilitate cleaning and repairs.

The main object of the invention is to provide an automobile radiator wherein the circulating water cooling system is independent of the radiator frame, and said frame is so divided or split as to constitute a sectional frame which may be readily taken apart to facilitate the assembling of the radiator or the removal of the cooling system for purposes of cleaning and repairs.

A further object is to provide an automobile radiator which will have the appearance and finish of the ordinary unitary radiator, while being capable of being quickly taken apart to permit the repairing of the frame, or the cleaning or straightening of clogged or injured tubes.

A still further object is to provide an automobile radiator wherein the frame acts solely as a keeper or housing for the circulating water tubing, and forms no part of the channel for the circulating water, thus permitting said parts to be manufactured and repaired entirely independently of each other.

A still further object is to provide an automobile radiator, wherein all of the circulating water tubes will be straight, and open outwardly into a closed chamber having a water tight but removable closure, and partitions, forming a tortuous channel through all the radiator tubes, thus giving the desired circulation through air cooled tubes while permitting such convenient access to the tubes as to facilitate repairs.

A still further object is to provide an automobile radiator wherein the frame will be made of two separable channeled parts, the bottom of which will be secured to the under frame or bolster of an automobile, and the upper one, or cap, may be removed therefrom and from the machine to permit the radiator tubes to be quickly removed from an automobile, without injury to, or work upon the frame itself. And a still further object is to provide an automobile radiator which may be inexpensively produced and which will be so assembled as to make repairs thereto possible with little labor and small expense.

The invention consists primarily in an automobile radiator comprising a circulating water system independent of the radiator frame, a sectional radiator frame adapted to receive and retain said system, and means uniting the sections of said frame whereby said frame may be taken apart and the water cooling system removed therefrom; and in such other novel features of construction and combination of parts as are hereinafter set forth and described, and more particularly pointed out in the claims hereto appended.

Referring to the drawings: Figure 1 is a perspective view of the front hood of an automobile, showing my radiator in position thereon; Fig. 2 is a front view of said radiator partly in section and partly in elevation; and Fig. 3 is a section on the line 3—3 of Fig. 2.

Like letters refer to like parts throughout the several views.

In repair work on automobiles, I have found that where injury to an automobile results from a collision, the radiator, being at the extreme front of the machine, is most liable to injury, the frame frequently being bent and the tubes bent or dented. In addition to this, the sediment in the cooling water is deposited in such quantities in the circulating water cooling system, as to obstruct the tubes partially or wholly, thus impairing or destroying the efficiency of the radiator. It is now a common, if not a general practice in the manufacture of automobile radiators to form the air cooled tubes of a single continuous sinuous tube or pipe, or a group or nest of such, and to solder or braze the frame thereto, thus utilizing the frame for decorative or finishing purposes solely, and making it necessary in case repairs to the tube are required, to remove the entire radiator, frame and all, from the automobile, remove the frame from the tubes by unmaking the soldered or brazed joints and after repairs are effected, resolder or rebraze the frame to the tubes. This procedure is slow and costly and is required to effect any repairs whatever whether such amounts to the installation of new tubing or the removal of an unsightly dent in the frame or the tubes, which does not affect the efficiency of the cooling system. This fixed heavy cost often causes automobilists to defer making repairs not materially affecting the efficiency of the radiator, and leads to many troubles through the clogging of the cooling system. In my present invention, I aim to avoid this item of expense by making the structure of the radiator such that any part may be readily and cheaply accessible, thus permitting the top of the frame to be removed for repairs without disturbing the tubing, or the tubing itself, to be so quickly removed and replaced as to eliminate those expensive operations above referred to. Incidentally, I aim to so construct and arrange the cooling tube system that after it has been removed, it may be quickly repaired, and without impairing its efficiency. In the accompanying drawings I have shown an embodiment of my invention by which I accomplish such results.

In the drawings, I have shown at $a$ the bolster or under frame of an automobile. Mounted on said bolster or under frame $a$, is the radiator frame, which consists of a bottom part $b$ and a top frame $c$ of the radiator frame. Each of these sections $b$ $c$ is provided with back and front flanges $b'$ $b^2$, $c'$ $c^2$, extending entirely around same, the flange $b'$ being adapted to be caused to aline with the flange $c'$ and the flange $b^2$ with the flange $c^2$. These flanges form a continuous channel adapted to receive the tube system, and are of a width which is variable, so as to inclose the ends, top and bottom of said system, and disclose forwardly thereof only a series of straight tube sections, and sufficient thereof to expose as great an area of tube surface to the air currents as is feasible without sacrificing the decorative appearance of the radiator. The bottom section $b$ is provided with a laterally projected lug $d$ on each side thereof adapted to rest upon and be secured to the frame $a$ by means of the screw threaded stud $e$ passing through an opening therein and projecting upwardly, thus causing said part to be suspended from said frame. The top frame $c$ is provided with similar lugs $d'$ adapted to pass over the upwardly projected ends of the screw threaded stud $e$ and be clamped upon the lugs $d$ by means of the nuts $e'$ in a manner to make said frame, when assembled practically a continuous frame, both in function and in appearance. To cause the clamping action of the nuts $e'$ or the flanges $d'$ to firmly bind the radiator tube system within the housing formed by the bi-part frame $b$—$c$, I provide said parts respectively with a plurality of nubs $f$ $f'$ $f^2$ projecting into the channel within said frame at divergent points, thus avoiding the necessity for having the contacting parts of the frame and the radiator tube system perfectly true, while holding the radiator tube system tight. I have shown these nubs as being made integral with the frame, and of the same material, but their construction and arrangement is immaterial as long as they provide reasonably stable widely divergent contact points bearing upon the radiator tube system on all sides so as to prevent a rattling of said system within said frame. This arrangement gives the desired stability to the radiator as an entirety without the necessity for soldering or brazing the frame and the tube system together. The top frame $c$ has centrally of the top thereof, an opening $c^3$ adapted to receive the neck of the filling nozzle of the tube system, and the bottom section $b$ has an opening $b^3$ therethrough adapted to permit the drain cock to project below said frame. The flanges $b'$ $c'$ are also provided with slotted openings $b^4$ $c^4$ to allow a clear field for the leads coupled to the pipes to the circulating system for the engine, in order to permit the removal of the cap or crown $c$, and of the tube system itself.

While various types of air cooled tubes may be employed, in carrying out my invention, I preferably employ a special type of such especially adapted for use in connection with a bi-part frame, as described. In this type of tube system, I employ a tube system proper, having so far as the circulating system is concerned, the efficiency of certain well known condensers, but differing therefrom in that the tubes are flattened, and of a width substantially equaling that of the entire radiator. These tubes extend from side to side in a straight line, and each end thereof discharges into a casing formed of an inner shell $g$ and outer shell $h$, which shells are united by water tight sides $i$ to form a top, a bottom and two side chambers. To make the tubes $j$ accessible, for cleaning and repairing purposes, I form the shell $h$ on each side of the radiator, of a plurality of independent plates $h'$ $h^2$ attached to the sides $i$ by a temporary joint as of solder thus permitting a single plate $h'$ $h^2$ to be removed without disturbing the remaining plates. The top of the shell $g$ is extended on one side to close the side chamber on that side, and the bottom of the shell $g$ is similarly extended to close the other side chamber. The side chambers themselves are each divided by partitions $k$ $k'$ $k^2$ into a plurality of independent chambers each having one or more tubes $j$ discharging thereinto and leading therefrom, such partitions being so staggered as to set up a continuous circulation from the top chamber through the various tubes $j$ from one side chamber to the other, finally discharging into the bottom chamber. The radiator casing has a lead $m$ through which water from the engine is discharged into the top chamber thereof, and a second lead $n$ through which water is drawn by the pump from the bottom chamber, each said lead being coupled to the circulating pipes adjacent to the radiator so as to facilitate the disconnection of the radiator. Connected with the bottom chamber of the casing $h$ is an ordinary drain cock $o$.

The operation of the herein described radiator is substantially as follows:—The bottom frame $b$, the top frame $c$, and the radiator proper $h\ j$ are made complete, and apart from each other, and the device is assembled by first placing the studs $e$ in the vehicle frame $a$ with the screw threaded end projecting upwardly. The bottom frame $b$ is then mounted on said frame by sliding the lugs $d$ over said studs thus forming a hanging channel supported directly from the frame $a$ as described. The radiator proper is then deposited in this frame, the drain cock $o$ passing through the opening $b^3$ therein, and the lead $n$ passing through the slot $b^4$ in the flange $c'$ until the radiator comes to rest upon the nubs $f$. The top frame, $c$, is then brought with the side flanges $c'\ c^2$ thereof in closing the edges of the casing $h$ and the said top frame cap or crown slid upon the said casing until the lugs $d'$ thereon pass over the studs $e$ thus bringing the flanges $b'\ b^2\ c'\ c^2$ into direct alinement with each other, and with their adjoining edges into such close proximity as to make it possible by drawing the two sections of the frame together by means of the nuts $e'$, to form a practically invisible joint at this point. This clamping of the two sections close together also brings the nubs $f^2$ firmly upon the top of the casing $h$ so as to bind said casing between said nubs and the bottom nubs $f$. The side nubs $f^2$ are also brought, by this operation, into such position relative to the sides of the casing $h$ as to prevent a lateral movement of said casing. When so assembled the filling nozzle $p$ passes through the openings $c^3$, the cap of said nozzle being removed if said opening is not large enough for this purpose.

When the device has been so assembled, the leads $m\ n$ are coupled to their respective pipes of the circulating water system to and from the engines.

In operation, the water from the water jacket of the engine passes to the top chamber of the casing $h\ h'$ passing therefrom to the topmost independent chamber of one side chamber, above the partition $k$ through a plurality of tubes $j$ to the uppermost independent side chamber on the opposite side thereof and back and forth from side chamber to side chamber in the course defined by the partitions $k'\ k^2$ finally discharging into the bottom chamber and being drawn therefrom through the lead $n$. The tubes $j$ being flat and of a width approximating the depth of the entire radiator, a sufficiently large surface is exposed to the atmosphere to afford ample heat radiating surfaces.

In case of damage to the top frame $c$ it is merely necessary to remove the nuts $e'$ and slide the said top frame from the radiator without disturbing the tubing or pipe connections, a result which may be effected with little labor or inconvenience. When the top frame is so removed, it may be replaced by a new top frame or have any dents pounded out, or other repairs made thereto quickly; all parts thereof being readily accessible, and requiring no cleaning to prepare them for such work. If, however, the tubes themselves require cleaning, or repairing, the top frame $c$ is removed as above, the pipe connections between the radiator and the circulating water system are uncoupled, and the radiator itself is lifted from the bottom frame. To get access to any particular tube when the repairs are local, it is merely necessary to remove one of the detachable side plates $h'$ or $h^2$ opposite the end of the tube to be repaired, by unsoldering or undoing any other means securing it in place, thus exposing the other end of the tube in a manner to permit the insertion of the tools necessary to remove any dents or force any obstructions therefrom. If desired, all of these side plates may be removed quickly and quickly replaced to effect repairs throughout the radiator. It will thus be seen that in case of damage to the hanging bottom frame, this frame always remains upon the machine, and that the radiator may be dismembered quickly and as quickly reassembled, thus effecting a material saving in the cost of repairs, and at the same time avoiding the necessity to unmake a soldered or brazed joint between the frame and the tubes, and reunite these parts by resoldering or rebrazing. When so assembled the front flanges $c^2\ b^2$ extend over the sides $i$ in a manner to expose only the tubes $j$ thus serving to give "finish" to the radiator, and at the same time serve as retaining flanges for the radiator casing and tubes.

I am aware, that in surface condensers, a circulating system consisting of a plurality of staggered chambers connected by a plurality of straight pipes, so as to cause a zig zag circulation from the top to the bottom of the condenser is old in said art, and I do not intend to claim such broadly. The requirements peculiar to the automobile industry, however, are such as to impart particular advantages to this type of radiator when so modified as to make the ends of the tubes readily accessible, and I believe this feature of the cooling system to be new. I also believe it to be new to provide a bi-part separable frame, housing in the circulating water cooling system in a manner to permit the attachment of one or more parts independently of the others, and I intend to claim such broadly.

Having described my invention, what I claim as new and desire to have protected by Letters Patent is:—

1. In an automobile radiator, the combination with a water cooling system, of a sectional frame adapted to receive and retain said system, and means uniting the sections of said frame whereby said frame may be taken apart and the water cooling system removed therefrom.

2. In an automobile radiator, the combination of a bi-part frame consisting of a bottom frame provided with means whereby it may be suspended from the under frame or bolster, and oppositely disposed inwardly projected side flanges forming a channel within said frame adapted to receive a water cooling system a top frame, provided with oppositely disposed inwardly projected side flanges adapted to be alined with the flanges on said bottom frame and forming a channel therein, and means whereby said frames may be secured together, and a water cooling system adapted to be contained within the channels in said frames.

3. In an automobile radiator, the combination of a bi-part frame consisting of a bottom frame provided on the opposite sides thereof with laterally projected lugs adapted to pass over securing means on the underframe or bolster, and oppositely disposed inwardly projecting side flanges, said frame having an opening in the bottom thereof adapted to permit a drain cock to pass therethrough, and an opening in the inner flange for the passage of one of the leads to the circulating water system, a top frame provided on the opposite sides thereof with laterally projected lugs adapted to pass over said securing means and be clamped upon the lugs of said bottom frame, and oppositely disposed inwardly projected side flanges adapted to be alined with the side flanges on said bottom frame, said top frame having an opening therein adapted to permit the filling nozzle to pass therethrough and an opening in the inner flange for the passage of one of the leads to the circulating water system, securing means adapted to coöperate with said lugs, means clamping said top frame, upon said bottom frame, and a circulating water cooling system containing a filling nozzle, a drain cock, and leads to the circulating water system adapted to be contained within said frame.

4. In an automobile radiator, the combination of a bi-part frame consisting of a bottom frame provided with means whereby it may be suspended from the vehicle underframe or bolster, and oppositely disposed inwardly projected side flanges forming a channel within said frame adapted to receive a water cooling system, and a plurality of nubs arranged at divergent points on the bottom of said channel, a top frame, provided with oppositely disposed inwardly projected side flanges adapted to be alined with the flanges on said bottom frame, and forming a channel therein, and a plurality of nubs arranged at divergent points on the bottom of said channel, and means whereby said frames may be secured together, and a water cooling system adapted to be contained within the channels in said frames and be engaged by said nubs.

5. In an automobile radiator, the combination of a bi-part frame adapted to receive and retain a circulating water cooling system, and means uniting said parts whereby said frame may be taken apart, and the water cooling system removed therefrom, and a water cooling system comprising a double shell casing having water tight sides whereby a top and a bottom chamber and side chambers are formed and said casing is adapted to be retained within said frame, a plurality of staggered partitions dividing each said side chamber into a plurality of independent chambers, a plurality of straight tubes extending from one side chamber to the other, whereby water is circulated from said top chamber, through said side chambers alternately to said bottom chamber, and leads extending from said top chamber and said bottom chamber respectively.

6. In an automobile radiator, the combination of a bi-part frame adapted to receive and retain a circulating water cooling system and means uniting said parts whereby said frame may be taken apart and the water cooling system removed therefrom, and a water cooling system comprising a double shell casing having water tight sides whereby a top and a bottom chamber and side chambers are formed and said casing is adapted to be retained within said frame, a plurality of staggered partitions dividing each said side chamber into a plurality of independent chambers, a plurality of straight tubes extending from one side chamber to the other whereby water is circulated from said top chamber through said side chambers alternately to said bottom chamber, the sides of the outer casing of said double shell being formed of a plurality of closure plates secured to the casing by a temporary joint, whereby ready access may be had to the open ends of said tubes, and leads extending from said top chamber and said bottom chamber respectively.

7. In an automobile radiator, a circulating water cooling system comprising an inner shell, an outer shell having a plurality of side plates secured in place by a temporary joint, and water tight sides forming within said shells a top chamber a bottom chamber and side chambers, a plurality of staggered partitions dividing each said side chamber into a plurality of independent chambers, a plurality of straight laterally extended tubes passing through said inner shell and opening into each said side chamber, whereby water is circulated from said top chamber, through said side chambers alternately through said tubes, to said bottom chamber, and leads extending from said top chamber and said bottom chamber.

In witness whereof I have hereunto affixed my signature this 15th day of October, 1907, in the presence of two witnesses.

ISIDOR COOPER.

Witnesses:
 August Hoh,
 F. T. Wentworth.